(12) United States Patent
Kim et al.

(10) Patent No.: US 9,641,740 B2
(45) Date of Patent: May 2, 2017

(54) APPARATUS AND METHOD FOR AUTO-FOCUSING IN DEVICE HAVING CAMERA

(71) Applicant: Samsung Electronics Co., Ltd., Gyeonggi-do (KR)

(72) Inventors: Kyunghwa Kim, Seoul (KR); Seonhwa Kim, Seoul (KR); Heejin Kim, Seoul (KR); Mijung Park, Gyeonggi-do (KR); Seockhyun Yu, Seoul (KR); Joah Choi, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 14/254,820

(22) Filed: Apr. 16, 2014

(65) Prior Publication Data

US 2014/0307146 A1    Oct. 16, 2014

(30) Foreign Application Priority Data

Apr. 16, 2013  (KR) .......................... 10-2013-0041668

(51) Int. Cl.
*H04N 5/232* (2006.01)
*G03B 13/36* (2006.01)
*G03B 17/18* (2006.01)

(52) U.S. Cl.
CPC ..... *H04N 5/23212* (2013.01); *H04N 5/23219* (2013.01); *H04N 5/23293* (2013.01); *G03B 13/36* (2013.01); *G03B 17/18* (2013.01)

(58) Field of Classification Search
None
See application file for complete search history.

(56) References Cited

U.S. PATENT DOCUMENTS

| | | | |
|---|---|---|---|
| 2002/0093531 A1* | 7/2002 | Barile | H04N 7/142 715/753 |
| 2007/0027911 A1* | 2/2007 | Hakala et al. | 707/104.1 |
| 2008/0071749 A1 | 3/2008 | Schloter | |
| 2009/0167883 A1* | 7/2009 | Nozaki | 348/222.1 |
| 2009/0247219 A1 | 10/2009 | Lin et al. | |
| 2010/0046842 A1* | 2/2010 | Conwell | 382/218 |
| 2010/0066847 A1 | 3/2010 | Suzuki et al. | |
| 2010/0123790 A1 | 5/2010 | Takano et al. | |
| 2011/0111769 A1* | 5/2011 | Yeon | 455/456.1 |
| 2011/0115945 A1* | 5/2011 | Takano | G03B 13/18 348/231.99 |
| 2011/0249144 A1* | 10/2011 | Chang | 348/231.3 |

(Continued)

FOREIGN PATENT DOCUMENTS

| | | |
|---|---|---|
| EP | 2 187 623 A1 | 5/2010 |
| WO | WO 2008/032203 A2 | 3/2008 |

OTHER PUBLICATIONS

Extended European Search Report dated Aug. 28, 2014 in connection with European Patent Application No. 14164883.2; 8 pages.

*Primary Examiner* — Justin P Misleh

(57) ABSTRACT

This disclosure provides an apparatus and a method for auto-focusing in a device having a camera. The method includes displaying a focus item in a preview screen while driving a camera, auto-focusing by searching an image of the focus item from a preview image and displaying a focus mark, and processing a focused image if the auto-focusing is completed.

10 Claims, 9 Drawing Sheets

(56) References Cited

U.S. PATENT DOCUMENTS

| | | |
|---|---|---|
| 2012/0044401 A1 | 2/2012 | Parviainen |
| 2012/0098999 A1* | 4/2012 | Chen .......................... 348/231.5 |
| 2013/0033611 A1* | 2/2013 | Chen .......................... 348/207.1 |
| 2013/0088413 A1* | 4/2013 | Raffle ................ G02B 27/0101 |
| | | 345/7 |
| 2013/0130711 A1* | 5/2013 | Bergsbjork ............ H04W 4/02 |
| | | 455/456.1 |

* cited by examiner

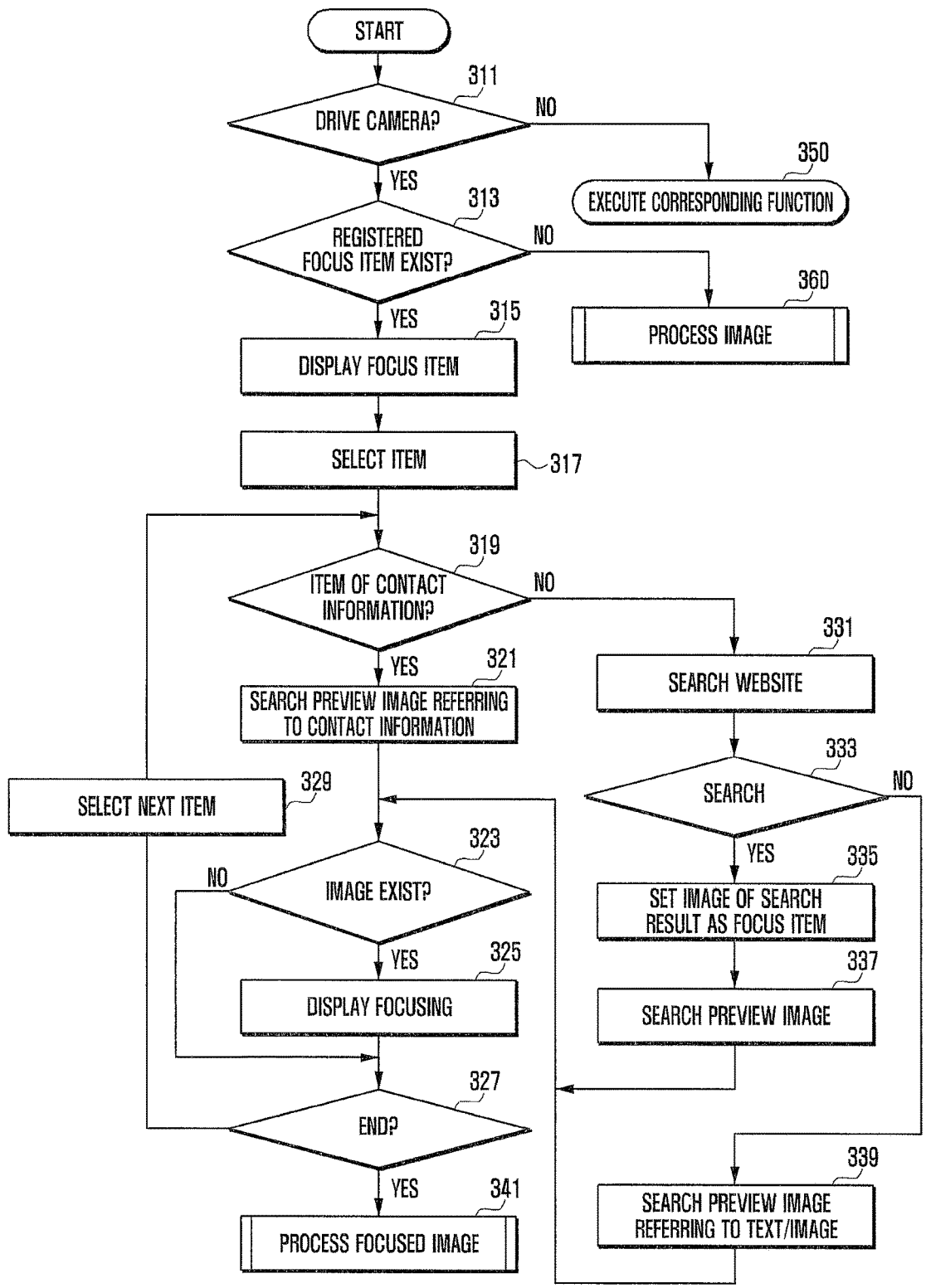

ANALYZED COLOR CODE

APPARATUS AND METHOD FOR AUTO-FOCUSING IN DEVICE HAVING CAMERA

CROSS-REFERENCE TO RELATED APPLICATION(S) AND CLAIM OF PRIORITY

The present application is related to and claims the benefit under 35 U.S.C. § 119(a) of a Korean patent application filed on Apr. 16, 2013 in the Korean Intellectual Property Office and assigned Ser. No. 10-2013-0041668, the entire disclosure of which is hereby incorporated by reference.

TECHNICAL FIELD

The present disclosure relates to an apparatus and a method for processing an image in a device having a camera and, more particularly, to an apparatus and a method for processing an image by automatically focusing a subject.

BACKGROUND

When photographing an image in a device having a camera, a subject to be photographed must be set and focused. The focusing method in the prior art can be divided into two methods of an auto-focusing and a manual focusing. The auto-focusing method is to focus on the center of an image, and the manual focusing method is to focus on a specific area of a screen manually selected by a user.

However, in the focusing method of the prior art, the camera must be controlled to focus on a desired subject, and the focusing must be performed every time whenever photographing a specific person or object in a continuous photographing mode.

SUMMARY

To address the above-discussed deficiencies, it is a primary object to provide at least advantages described below. Accordingly, an aspect of the present disclosure is to provide an apparatus and a method for automatically focusing on a predetermined subject to be photographed by selecting the subject and tracking a preview image while operating a camera.

In accordance with an aspect of the present disclosure, a method for automatically focusing in a device having a camera includes displaying a focus item in a preview screen while driving a camera. The method also includes auto-focusing by searching an image of the focus item from a preview image and displaying a focus mark. The method further includes processing a focused image if the auto-focusing is completed.

In accordance with another aspect of the present disclosure, an apparatus includes a camera configured to generate a preview image. The apparatus also includes a display unit configured to display the preview image. The apparatus further includes a control unit configured to display a predetermined focus item in the preview screen while driving the camera, and to focus display a focus mark by searching the preview image for an image of the focus item.

In accordance with another aspect of the present disclosure, a camera includes a display configured to display the preview image. The camera also includes a controller configured to generate a preview image, to control the display to display a predetermined focus item in the preview screen while driving the camera, and to focus display a focus mark by searching the preview image for an image of the focus item.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts:

FIG. 3 illustrates a process for a procedure of automatically focusing in a portable terminal according to another embodiment of the present disclosure.

DETAILED DESCRIPTION

FIGS. 1 through 4F, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged system and method.

Hereinafter, embodiments of the disclosure are described in detail with reference to the accompanying drawings. The same reference symbols are used throughout the drawings to refer to the same or like parts. Detailed descriptions of well-known functions and structures incorporated herein may be omitted to avoid obscuring the subject matter of the disclosure.

An apparatus according embodiments of the present disclosure pre-registers a focus item, and automatically focuses by searching images corresponding to the registered focus item while operating a camera. A method for registering the focus item may be performed by registering a character or voice in a text, and further images displayed in a screen can be registered as a focus item. If the camera operates in the state of registering the focus item, the device searches preview images for an image of the registered focus item, focuses on the location of image corresponding to the focus item registered in the searching process by controlling the camera, and displays a focus mark in a display unit.

Here, the device having a camera may be a camera device, mobile phone, tablet PC, or portable PC. The embodiments of the present disclosure will be described, assuming that the device having a camera is a mobile phone.

Figure 1:
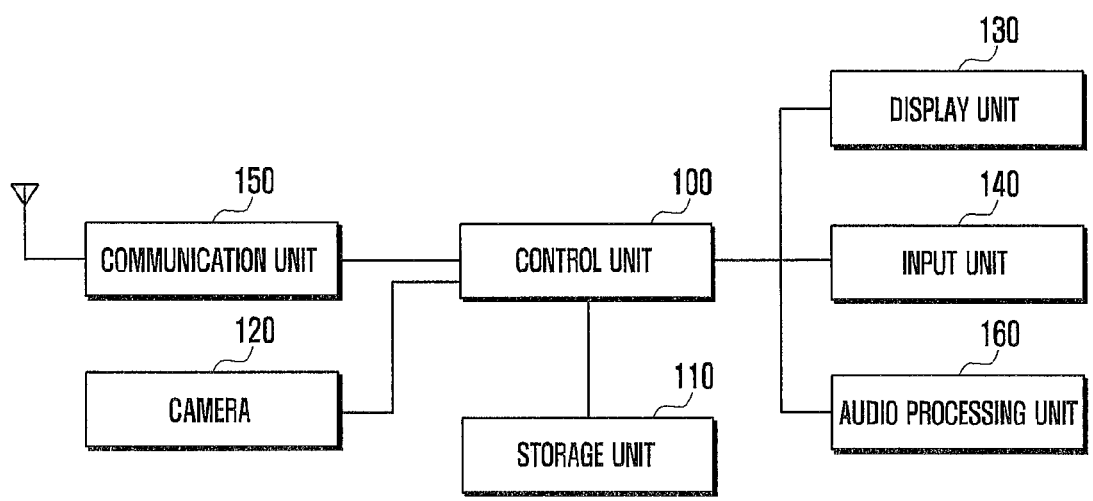
FIG. 1 illustrates a block diagram of a configuration of a portable terminal according to an embodiment of the present disclosure.

FIG. 1 illustrates a block diagram of a configuration of a portable terminal according to an embodiment of the present disclosure. Here, the portable terminal may be a mobile phone.

Referring to FIG. 1, the communication unit 150 performs a function of communicating with a base station or an internet server. The communication unit 150 may be configured with a transmitter for up-converting the frequency of a transmitting signal and amplifying an electric power, and a receiver for low-noise amplifying a received signal and down-converting the frequency of the received signal. Further, the communication unit 150 may include an encoder and a decoder. The encoder outputs a signal to the transmitter by encoding the signal, and the decoder decodes a signal received from the receiver. The encoder and decoder may be one of an LTE, WCDMA, GSM, WIFI, WIBRO, NFC, and Bluetooth. The communication unit 150 according to the embodiments of the present disclosure is assumed to include an LTE, WIFI, NFC, and Bluetooth communication units.

The camera 120 is driven under the control of the control unit 100, and photographs a subject. The camera 120 may be configured with a rear camera installed at the rear side of the terminal for photographing a high resolution image and a front camera installed at the front side of the terminal for photographing a relatively low resolution image.

The control unit 100 controls the general operation of the portable terminal, and automatically focuses on a predetermined focus item by searching a preview image while driving the camera 120 according to the embodiment of the present disclosure. The control unit 100 may include a recognizer for identifying a character and/or image in the preview image as a focus item.

The storage unit 110 may include a program memory for storing an operating program of terminal and programs according to the embodiment of the present disclosure, and a data memory for storing tables used for the operation of terminal and data generated while executing programs. In the embodiments of the present disclosure, the storage unit 110 may store predetermined focus items, and include contact information corresponding to the focus items. Here, the contact information may include an image.

The display unit 130 displays a focus mark in a preview image and an image of predetermined focus item under the control of the control unit 100. The display unit 130 may be an LCD or an OLED. The input unit 140 may be configured with a capacitive or resistive type, and output location information of a user's touch (hereafter, a finger touch is assumed) to the control unit 100. Further, the input unit 140 may include an EMR sensor, and detect a pen touch input in order to output to the control unit 100. Here, the display unit 130 and the input unit 140 may be configured in an integrated form.

The audio processing unit 160 processes a voice signal generated in a communication mode and an audio signal generated in a photographing mode of camera under the control of the control unit 100.

In the portable terminal having the above configuration, the control unit 100 stores a focus item in the storage unit 110 in a registration mode, and controls to display a preview image in the display unit 130 while driving the camera 120. When displaying the preview image, the control unit 100 tracks images in the preview image corresponding to the predetermined focus items, controls the camera 120 to automatically focus on an image matching the focus item, and controls to display a focus mark at a focused location in the display unit 130.

Firstly, the control unit 100 registers a focus item in a registration mode. Here, a method of registering the focus item may include a method of registering with a text (by typing a text) and a method of registering with an image. In the method of registering as a text, if a user inputs a focus item with a text or voice through the input unit 140 or audio processing unit 160 in the registration mode, the control unit 100 stores the focus item in the storage unit 110 by converting to a text. Alternatively, the focus item may be registered with an image by marking on the image. The image of focus item may be selected from the preview image or from a stored image (for example, an image stored in a gallery). In this embodiment, the control unit 100 registers an image selected from images displayed in the display unit 130 (for example, by tapping) as a focus item in the registration mode.

If the camera 120 is driven after registering the focus item, the control unit 100 displays a preview image output by the camera 120 in the display unit 130. The control unit 100 then searches the preview image for an image of registered focus item. If an image identical to the image of registered focus item exists, the control unit 100 controls the camera 120 to focus on the corresponding image and the display unit 130 to display a focus mark at the corresponding location of preview image.

If the focus item is a person, the control unit 100 decides face information matching a registered name as a focus item. If the focus item is a person's name, the control unit 100 searches for a name identical to a person's name registered in contact information of the storage unit 110 and decides a found face registered as a focus item. If data matching the contact information doesn't exist, the corresponding focus item may be ignored. Further, if a name registered as a focus item doesn't exist in the contact information, the control unit 100 may search a corresponding person through a website. If a corresponding image is found, the name of corresponding image can be determined as a focus item. If a plurality of search results is given, the control unit 100 may decide an image classified to the most accurate information as a focus item. If a focus item is found through a website, the control unit 100 registers the spelling of person's name.

Subsequently, the control unit 100 identifies an image of person registered through the contact information or website. If a matching image is found by searching the preview image for an image of focus item, the control unit 100 controls the camera 120 to automatically focus and displays a focus mark in the display unit 130. As the camera 120 moves, the control unit 100 controls to display a moving location of the image focused in the preview image by tracking.

As described above, if the focus item is a person's name, the control unit 100 firstly searches a call-log with a keyword of caller-ID, and if a caller-ID is not found, secondly searches a website. For example, if the focus item is set to John and the caller-ID of John doesn't exist, the control unit 100 may control an auto-focusing operation by using an image obtained from website.

Here, the contact information may include an image. For example, when a person's contact information, the contact information may include at least one of a person's name, telephone number, email information, SNS information, and image. Accordingly, if the person's name is set as a focus item, the control unit 100 searches the preview image for contact information of the person and an image matching the image of person set as a focus item. Further, the contact information may include color information. If a color is set as a focus item, the control unit 100 confirms the color set as a focus item in the contact information, and may perform a focusing operation on an image having a corresponding color in the preview image.

Further, if a character and/or image set as a focus item is not found through the contact information or website searching, the control unit 100 searches for a corresponding character and/or image in the preview image. If the corresponding character and/or image is found, the control unit 100 searches for an image of the corresponding location.

Figure 2:
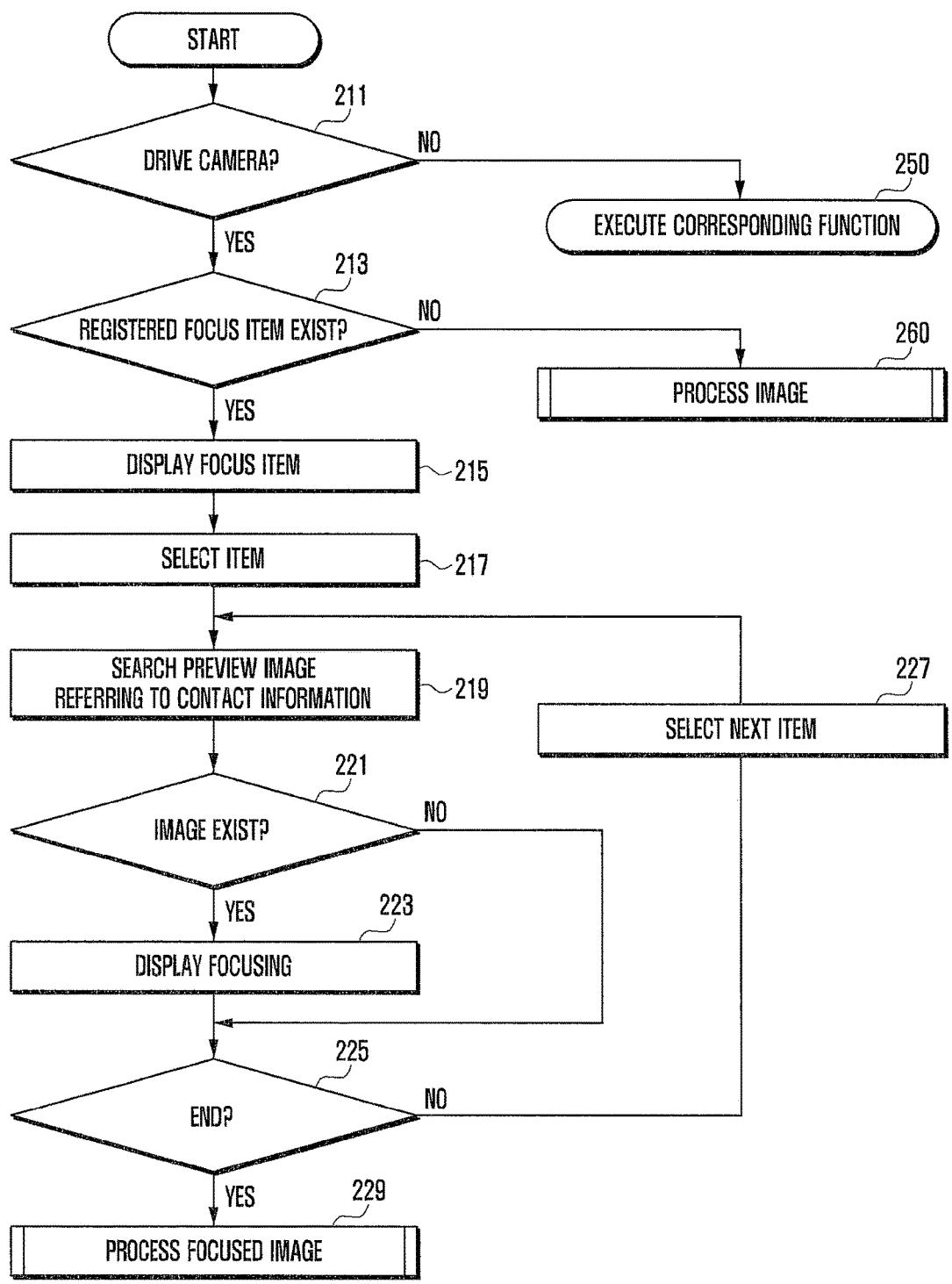
FIG. 2 illustrates a process for a procedure of automatically focusing a predetermined subject in a device having a camera according to an embodiment of the present disclosure.

FIG. 2 illustrates a process for a procedure of automatically focusing a predetermined subject in a device having a camera according to an embodiment of the present disclosure.

Referring to FIG. 2, if driving a camera is requested, the control unit 100 drives the camera 120 by detecting it, and displays an image output by the camera 120 in the display unit 130 as a preview image at operation 211. The control unit 100 checks whether a registered focus item exists at operation 213, and displays the registered focus item in the preview image if exist at operation 215. Here, the focus item may be registered with a character and/or an image. The registration of focus item may be performed by using a character or an image, and a portion of image (a preview image or an image stored in a gallery) displayed in the display unit 130 may be registered. The focus item may be more than one, can be set before driving a camera, and may be one registered in a previous state.

The focus item may be contact information stored in the storage unit 110. The control unit 100 selects the first item from predetermined focus items at operation 217, and searches for focus items in the contact information at operation 219. The contact information may include an image of the selected focus item or a color. If the focus item exists in the contact information and an image and/or color of the focus item is found from the preview image displayed in the display unit 130, the control unit 100 detects it at operation 221, and controls the camera 120 to automatically focus on the corresponding image and/or color at operation 223. The control unit 100 displays a focus mark on the preview image of the display unit 130 displayed at operation 223 to indicate that the auto-focusing has been performed. However, if the focus item doesn't exist in the contact information or an image of the focus item doesn't exist in the preview image, the control unit 100 detects it at operation 221 and proceeds to operation 225.

Subsequently, the control unit 100 checks whether a following focus item exists at operation 225, selects the following focus item if exists at operation 227, and repeats the above operations by proceeding to operation 219. If the focusing operation is finished for all the focus items, the control unit 100 detects it at operation 225, and processes the focused image at operation 229. Here, the control unit 100 displays a focus mark at the locations of auto focused images in the preview image displayed in the display unit 130, and stores an image by capturing the image output by the camera 120 in the storage unit 110 if a request for photographing is input through the input unit 140. Here, the image being stored in the storage unit 110 may correspond to an image focused according to the predetermined (registered) focus item.

FIG. 2 illustrates an example of which the predetermined focusing items are automatically focused according to the images stored in the contact information. However, if a predetermined focusing item is not included in the contact information, the portable terminal can identify an image by searching a website or by searching a preview image for a character and/or an image.

FIG. 3 illustrates a process for a procedure of automatically focusing in a portable terminal according to another embodiment of the present disclosure. FIGS. 4A to 4F illustrates screen examples of a method of automatically focusing according to the procedure of FIG. 3.

Referring to FIGS. 3 and 4A to 4F, if driving a camera is requested, the control unit 100 drives the camera 120 by detecting it, and displays an image output by the camera 120 in the display unit 130 as a preview image at operation 311. The control unit 100 then checks whether a registered focus item exists at operation 313, and displays the registered focus items in the preview image at operation 315. Here, the focus item may be at least one character and/or an image. The focus item may be set before driving the camera 120, or a focus item registered in a previous state can be used.

The control unit 100 selects the first item from the predetermined focus items at operation 317, and searches contact information for the focus items at operation 319. The contact information may include an image or a color of the selected focus item. If the focus item exists in the contact information, the control unit 100 detects it at operation 319, and searches a preview image referring to the image and/or color of contact information corresponding to the focus item at operation 321. If the image and/or color of focus item is found from the preview image displayed in the display unit 130, the control unit 100 detects it at operation 323, and controls the camera 120 to automatically focus on a corresponding location of the image and/or color at operation 325. The control unit 100 displays a focus mark at the location of focus item in the preview image displayed in the display unit 130 to indicate that the auto-focusing has been performed at operation 325. However, if an image of the focus item exits in the contact information but not in the preview image, the control unit 100 detects it at operation 323, and proceeds to operation 327.

If the focus item doesn't exist in the contact information at operation 319, the control unit 100 searches a website by connecting to an Internet network through the communication unit 150 at operation 331. If the focus item is found through the website searching, the control unit 100 detects it at operation 333, selects an image having the highest priority from the found images at operation 335, and searches for an image matching the image found from the preview image at operation 337. Subsequently, the control unit 100 identifies whether an image of the found focus item exists at operation 323, and if the image of the found focus item exists, control the camera 120 to automatically focus on a corresponding location of the image at operation 325.

However, if the focusing item is not found through the website searching at operation 333, the control unit 100 searches the preview image for a character and/or image of the focus item at operation 339. If a character and/or image of the focus item is found, the control unit 100 detects it at operation 323, and controls the camera 120 to automatically focus on a corresponding location of the image at operation 325.

As described above, the control unit 100 searches the contact information for a selected focusing item, performs auto-focusing if the focus item exists in the contact information, performs auto-focusing referring to an image found through web searching if the focus item doesn't exist in the contact information, and performs the auto-focusing by using information of focusing item itself (character and/or image) if the focus item is not found through both the contact information and web searching.

Subsequently, the control unit 100 checks whether the following focus item exists at operation 327. If the following focus item exists, the control unit 100 select the focus item at operation 329, and repeats the above operations by returning to operation 319. If the auto-focusing is completed for all the predetermined focus items, the control unit 100 detects it at operation 327, and processes the focused image at operation 341. Here, the control unit 100 displays a focus mark at a location of the auto-focused images in the preview image displayed in the display unit 130, and stores an image output by the camera 120 in the storage unit 110 by capturing the image if a request for photographing is input through the input unit 140. The image stored in the storage unit 110 may correspond to an auto-focused image including the predetermined (registered) focus items.

FIGS. 4A to 4F may assume that that the focus items are set with "John," "London Bridge," "Starbucks," and "white." If the camera is driven in the state of setting the focus items as above, the control unit 100 detects the predetermined focus items at operation 313, and displays the focus items of "John," "London Bridge," "Starbucks," and "white" in the preview image at operation 315.

Figure 4A:
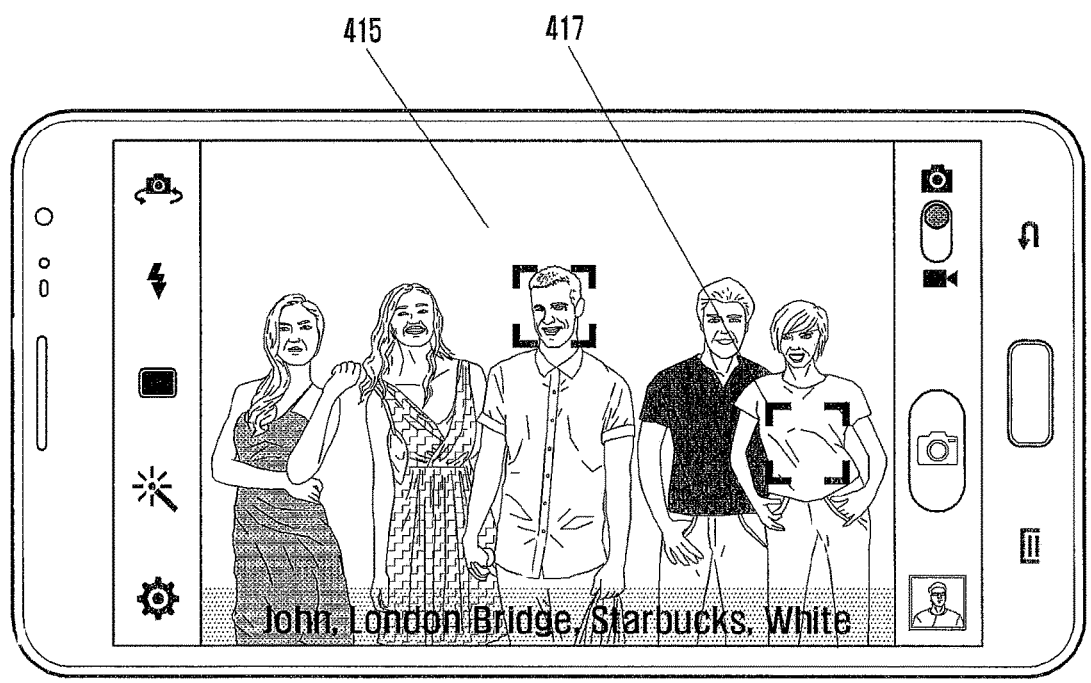
FIGS. 4A to 4F illustrate screen examples of a method of automatically focusing according to the procedure of FIG. 3.
Figure 4B:
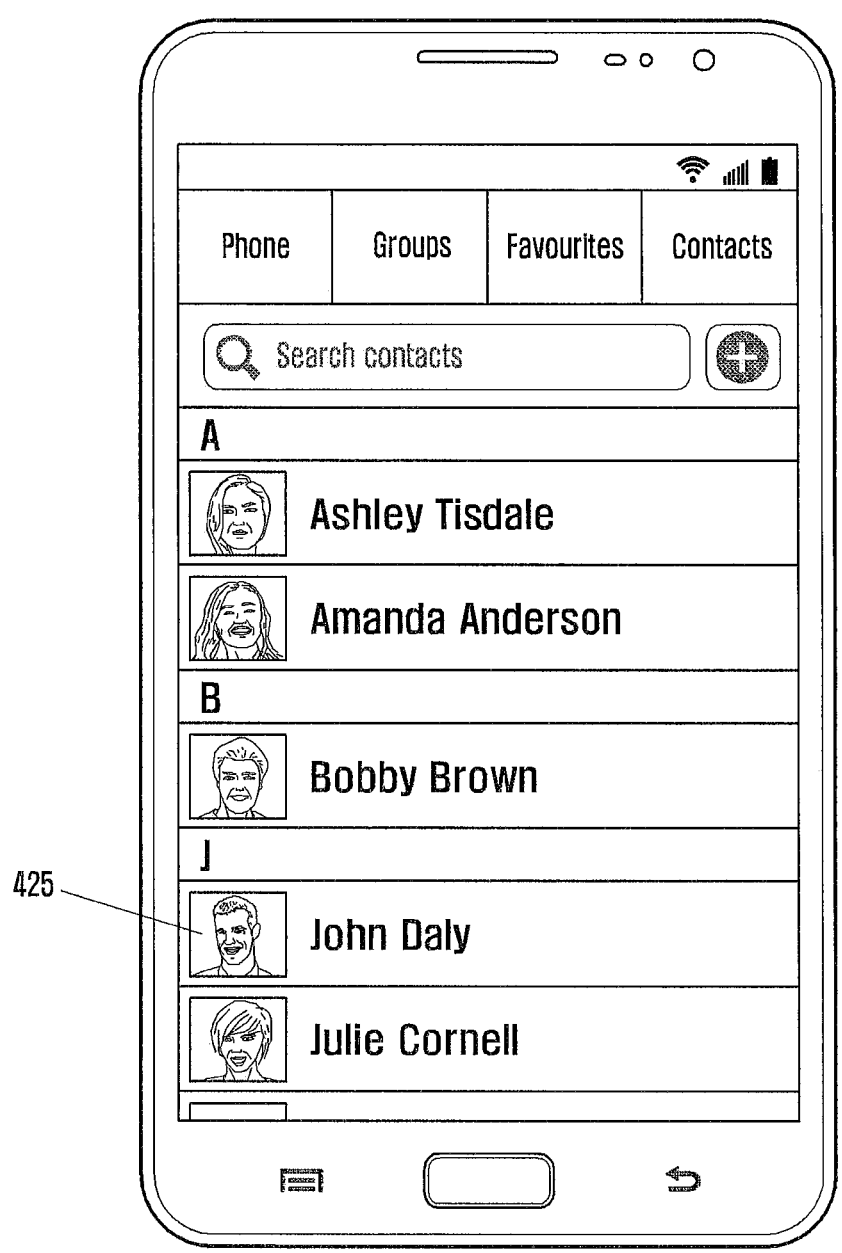
Figure 4C:
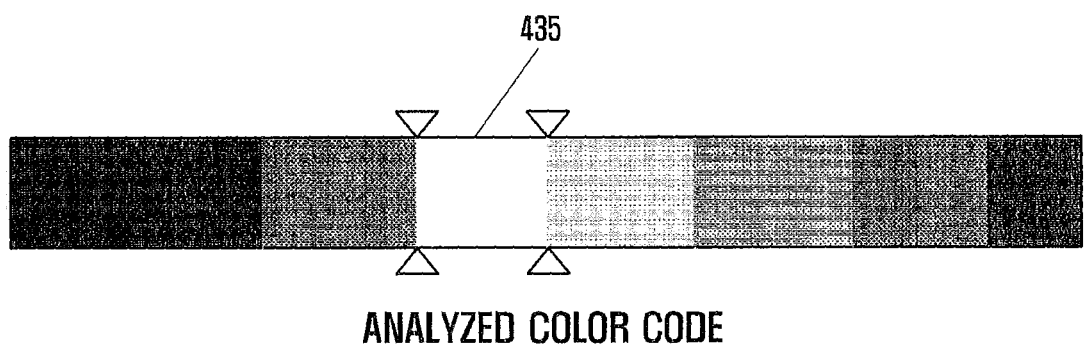

Firstly, if an image of a subject is obtained from the camera 120 as shown in FIG. 4A, the control unit 100 selects an item "John" at operation 317, and checks whether the item "John" is registered in the contact information at operation 319 as shown in FIG. 4B. If the item "John" is a caller-ID registered in the contact information as shown by 425 of FIG. 4B, the control unit 100 searches a preview image referring to the image of contact information at operation 321. Here, the control unit 100 may search for an image by comparing the image of contact information (image of John) with the preview image (for example, by using an analysis method of comparing a portion of face such as eyes). If a matching image exists, the control unit 100 detects it at operation 323, and displays a focus mark by focusing on the face of John at operation 325 as shown by 515 of FIG. 4A. Subsequently, the control unit 100 repeats the above operations by selecting the next focus item. While performing operations 319 to 321, the control unit 100 select a white color from color information (analyzed color code) shown in FIG. 4C, and checks whether a white colored image exists at operation 323. If a white colored image is found, the control unit 100 focuses on the white color and displays a focus mark at operation 325 as shown by 417 of FIG. 4A.

As described above, if a focus item registered by inputting a keyword is a person's name, the control unit 100 registers the corresponding face image as a focus item if the name include a caller-ID and matches the contact information, and focuses on the corresponding person's image by tracking the person's image, if the corresponding image exists in the preview image while driving the camera. Further, if a corresponding color determined from a color range exists in the preview image, the control unit 100 focuses on the color by tracking the color.

Figure 4D:
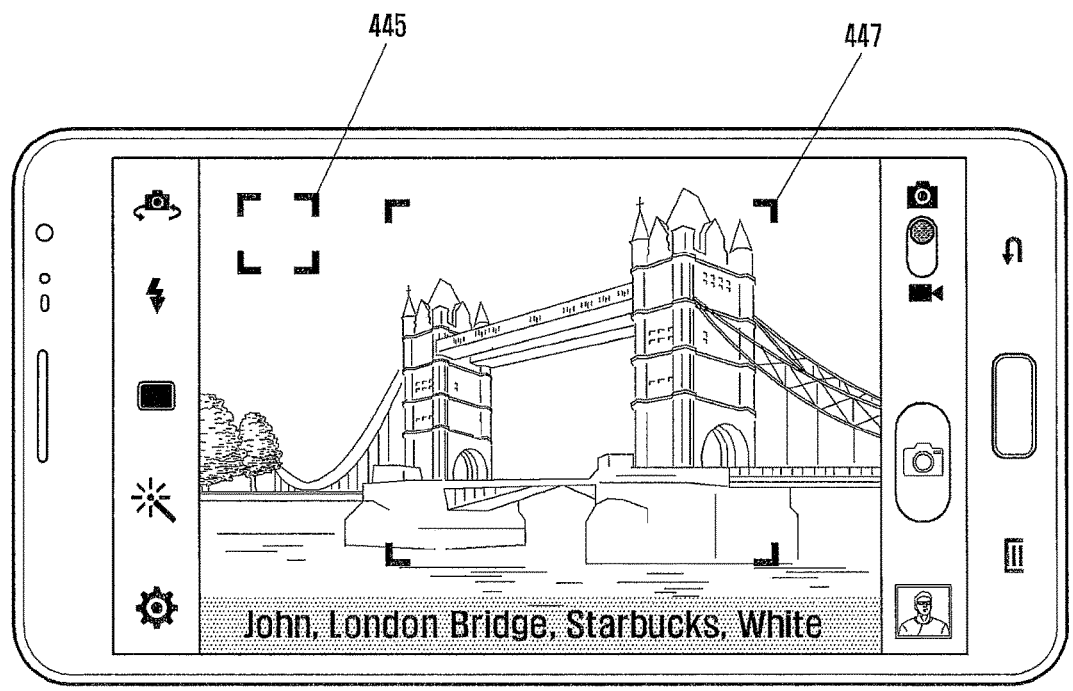
Figure 4E:
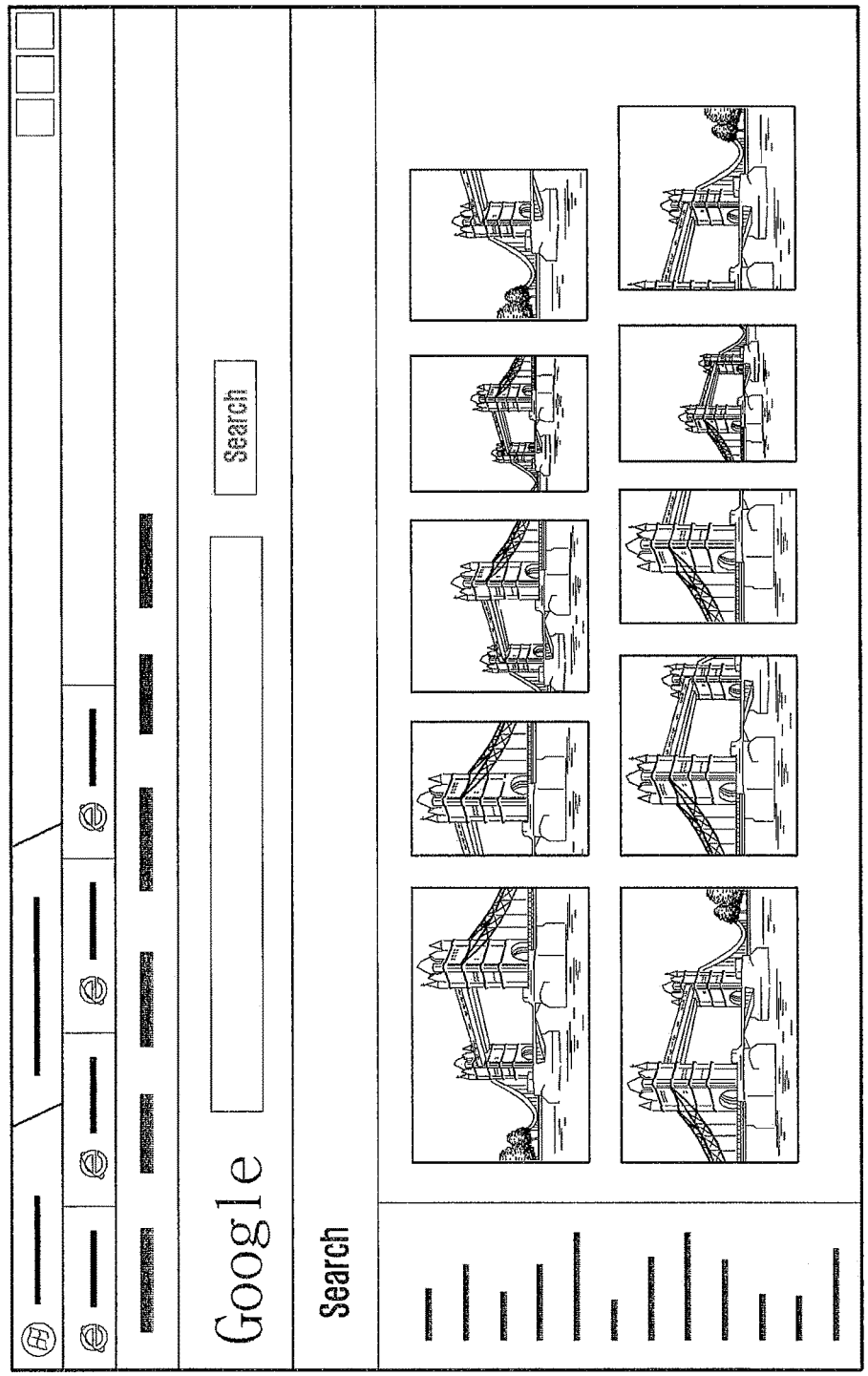

Secondly, if an image of subject is obtained from the camera 120 as shown in FIG. 4D, the control unit 100 selects the item John at operation 317, and checks whether the item John is registered in the contact information at operation 319 as shown in FIG. 4D. If the item "John" is caller-ID registered in the contact information as shown by 425 of FIG. 4B, the control unit 100 searches the preview image referring to the image of contact information at operation 321. If a matching image is not found, the control unit 100 identifies it at operation 323, and selects the next item "London Bridge" at operation 329. Because the item "London Bridge" is not registered in the contact information, the control unit 100 performs website searching by connecting to an internet network through the communication unit 150 at operation. If "London Bridge" is found through the website searching, the control unit 100 displays the search result at operation 335 as shown in FIG. 4E, and decides an image selected by a user as a focusing image. Here, the user may select an image from the displayed images shown in FIG. 4E, which is similar to the image displayed in the preview image. Alternatively, the control unit 100 may set an image of focus tem by automatically selecting the image from the images found through the website searching. Subsequently, the control unit 100 compares the image set by the website searching and the preview image at operation 337, and if a matching image is found at operation 323, displays a focus mark by focusing on the corresponding image as shown by 445 of FIG. 4D. Subsequently, while performing operations 319 to 321, the control unit 100 identifies a white color from color information (analyzed color code) shown in FIG. 4C and checks whether an image having a white color exists at operation 323. If an image having a white color is found, the control unit 100 displays a focus mark by focusing on the image having the white color at operation 325 as shown by 417 of FIG. 4A.

When an item of famous subject (for example, London Bridge) is registered by inputting a keyword, if the input keyword doesn't exist in the contact information or an image is not available for a caller-ID, the control unit 100 selects an image having the most accurate value through website searching, and performs focusing and tracking operations by comparing with a preview image. Further, if a color predetermined from a color range exists in the preview image, the control unit 100 performs focusing and tracking of an image having the corresponding color.

Figure 4F:
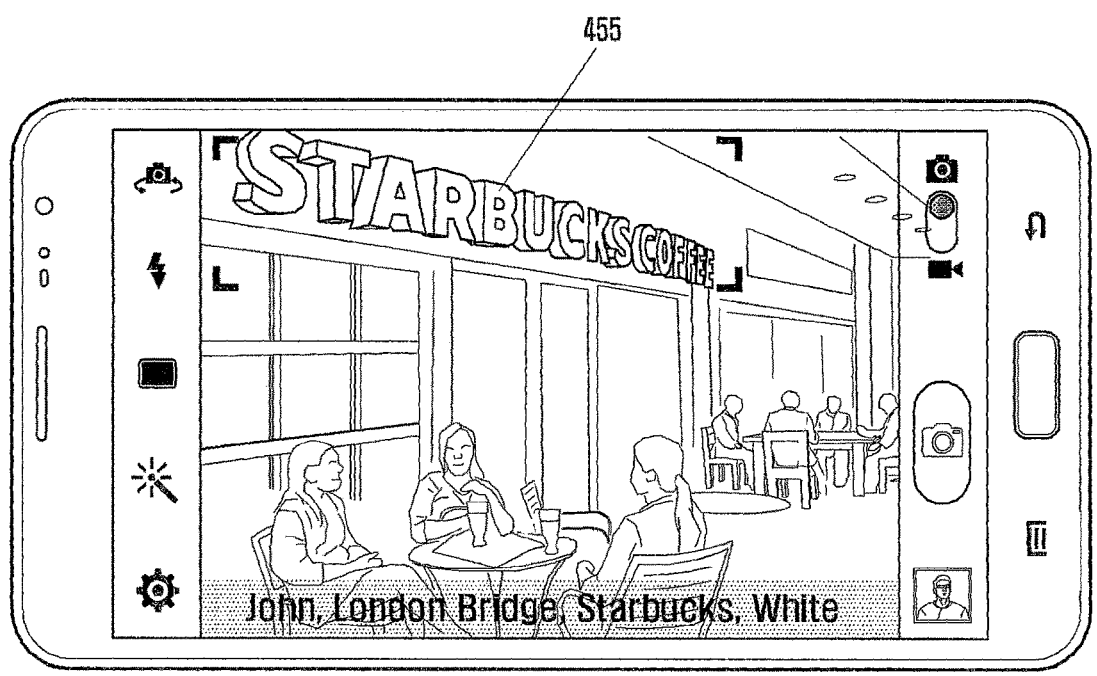

Thirdly, if an image is obtained from the camera 120 as shown in FIG. 4F, the control unit 100 cannot focus on an image of predetermined focus item even though the search of contact information and website is performed. The control unit 100 detects it at operation 333, and searches for a character and/or image of the predetermined focus item at operation 339. Here, a character recognition method may be used for a text search, or an image comparison method may be used. If characters registered as the focus item (for example, Starbucks) exists in the preview image as shown in FIG. 4F, the control unit 100 detects it at operation 323, and displays a focus mark of the corresponding image as shown by 455 of FIG. 4F.

If an item registered by inputting a keyword is set as a focus item, the control unit 100 recognizes characters in the preview image by using an OCR (Optical Character Reader) technology, and performs focusing and tracking operations if corresponding characters exist. Because the control unit 100 knows a keypad mode of the input characters, languages having a similar form (for example, English and Spanish) can be easily recognized. Namely, because the control unit 100 searches characters input by using an English keypad also in an OCR searching of English mode, and thereby the accuracy of recognition can be improved without changing a language mode.

While the auto-focusing is performed as above, an area predetermined by a user can be focused. Namely, the control unit 100 performs an auto-focusing operation by analyzing focus items predetermined while displaying a preview image. If the user marks a specific image in the preview image with a closed loop, the control unit 100 registers the marked image as a focusing item. Thereafter, if an image identical or similar to the registered image is input, the control unit 100 can perform focusing and tracking of the corresponding image.

As described above, the focusing method according to an embodiment of the present disclosure can be performed in the following procedure. Firstly, a predetermined focus item can be focused by using search results in three categories (contact, website search, and text). If an image is searched simultaneously through contact information and a website, the control unit 100 may process the image by assigning a higher priority for an image matching value of contact information (caller-ID when a person) than that of website image. For example, if an item "John" exists in both the caller-ID and website, the focusing operation is performed based on the caller-ID. When performing focusing by using a keyword, the focus item is maintained unless the keyword is deleted. For example, if a baby's name is registered as the focus item, the control unit may perform auto-focusing whenever the corresponding baby appears in a preview image. In this embodiment, the registered baby's face may be the only baby face focused and not all of the appearing babies' faces.

In a device having a camera, a focus item may be pre-registered before driving a camera, and auto-focusing can be performed by searching images in a preview image corresponding to the registered focus items while driving the camera. Therefore, a subject can be auto-focused while driving the camera and a plurality of subjects can be continuously focused.

Although the present disclosure has been described with an example embodiment, various changes and modifications may be suggested to one skilled in the art. It is intended that the present disclosure encompass such changes and modifications as fall within the scope of the appended claims.

What is claimed is:

1. A method for focusing in a device having a camera, the method comprising:
   acquiring images through the camera;
   displaying a preview image based on the acquired images and a focus item as a text overlaying the preview image in a preview screen while acquiring images through the camera;
   identifying a caller-ID in contact information corresponding to the text;
   obtaining an image of the caller-ID as an image of the focus item from the contact information;
   focusing a part of an image of the acquired images corresponding to the image of the focus item from the preview image and displaying a focus mark corresponding to the part of the image; and
   capturing a focused image according to the focus item and based on a user's input,
   wherein the focus item is an object to be focused on from the preview image while acquiring images through the camera.

2. The method of claim 1, wherein the focus item is a person's name, and the focusing searches the preview image for one of a portion and a whole of a face image.

3. The method of claim 1, further comprising: displaying another focus item, wherein the another focus item is a color and the focusing searches the preview image for the color.

4. The method of claim 1, wherein if the caller-ID cannot be identified, obtaining the image of the focus item by searching a corresponding person through a website.

5. The method of claim 1, further comprising: displaying another focus item, wherein the another focus item is a character, and the focusing comprises focusing an area of the preview image corresponding to the character of the focus item.

6. An apparatus, the apparatus comprising:
   a camera;
   a display unit; and
   a controller configured to:
      control the camera to acquire images,
      control the display unit to display a preview image based on the acquired images and a focus item as a text overlaying the preview image in a preview screen while acquiring images through the camera,
      identify a caller-ID in contact information corresponding to the text,
      obtain an image of the caller-ID as an image of the focus item from the contact information,
      focus a part of an image of the acquired images corresponding to the image of the focus item from the preview image and displaying a focus mark corresponding to the part of the image, and
      capture a focused image according to the focus item and based on a user's input,
   wherein the focus item is an object to be focused on from the preview image while acquiring images through the camera.

7. The apparatus of claim 6, wherein the focus item is a person's name, and the controller is configured to search the preview image for one of a portion and whole of a face image.

8. The apparatus of claim 6, wherein the controller is further configured to: control the display unit to display another focus item, wherein the another focus item is a color, and search the preview image for the color.

9. The apparatus of claim 6, further comprising a communication unit configured to connect with an internet network for searching a website, wherein the controller is configured to, if the caller-ID cannot be identified, obtain the image of the focus item by searching a corresponding person through a website.

10. The apparatus of claim 6, wherein the controller is further configured to control the display unit to display another focus item, wherein the another focus item is a character, and the focusing comprises focusing an area of the preview image corresponding to the character of the focus item.

* * * * *